Dec. 11, 1928.
W. H. GUTHRIE
1,694,443
TOOL FOR REMOVING HEADLIGHT RIMS
Filed Nov. 17, 1926  2 Sheets-Sheet 1
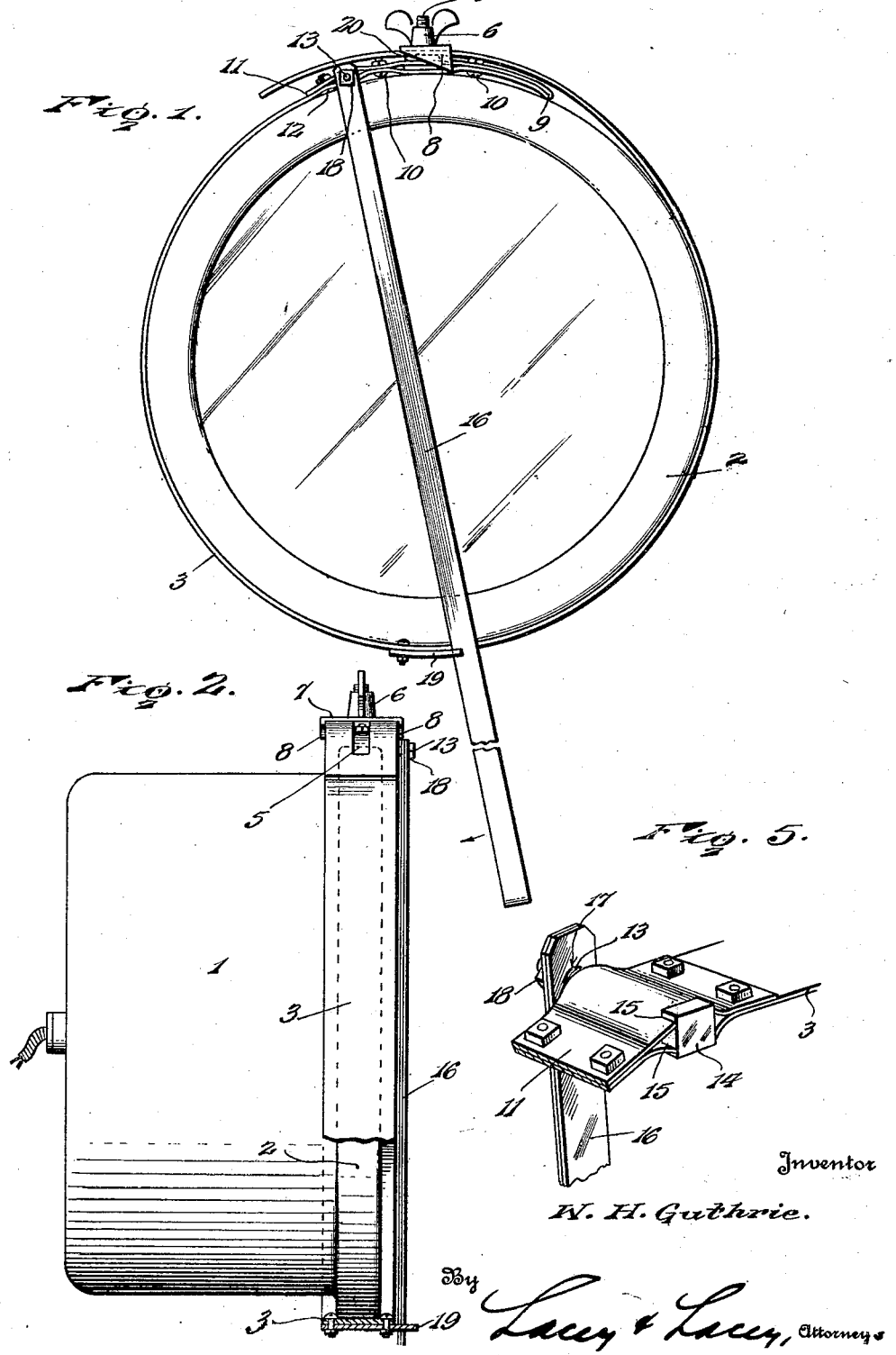

Dec. 11, 1928.
W. H. GUTHRIE
1,694,443
TOOL FOR REMOVING HEADLIGHT RIMS
Filed Nov. 17, 1926    2 Sheets-Sheet 2
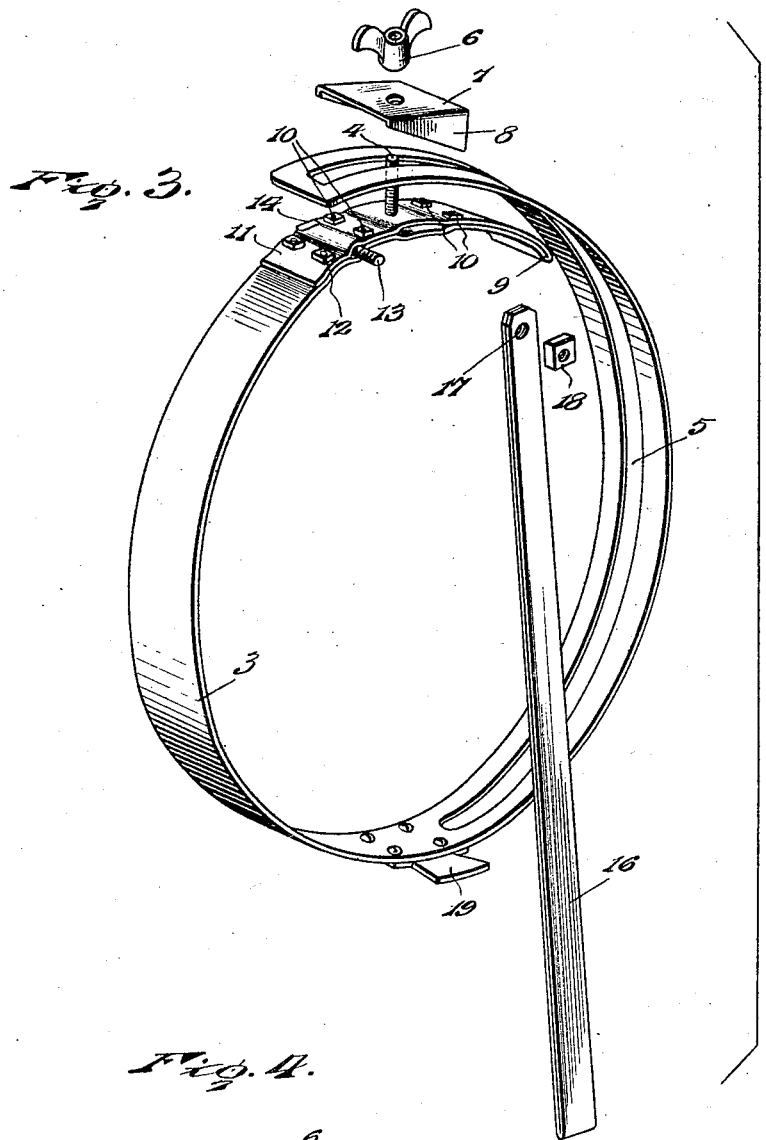
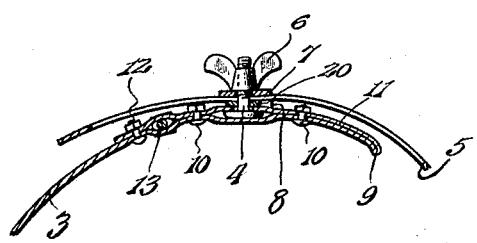
Inventor
W. H. Guthrie.
By Lacey & Lacey, Attorneys Patented Dec. 11, 1928.

1,694,443

UNITED STATES PATENT OFFICE.

WILLIAM H. GUTHRIE, OF ATLANTIC CITY, NEW JERSEY.

TOOL FOR REMOVING HEADLIGHT RIMS.

Application filed November 17, 1926. Serial No. 148,899.

This invention has for its object the provision of a simple and inexpensive tool by the use of which the rims of headlights may be easily removed from or applied to the headlight bodies. When it is necessary or desirable to remove a headlight lens in order to clean the same or possibly substitute a new lens for a broken lens, it is frequently difficult to remove the lens-holding rim from the headlight body owing to the fact that moisture may seep into the rim so that rusting occurs and the rim cannot be easily moved. Accidental blows upon the rim also frequently cause bending or denting of the same so that the parts become deformed and as a result will bind so that the rim cannot be removed by hand and the use of some tool whereby sufficient force may be applied to loosen the rim without causing serious damage to the same or other parts is necessary. Such a tool is provided by the present invention which also provides a tool capable of adjustment to a wide range of headlights and easily operable to either remove a rim or apply a rim. The invention is illustrated in the accompanying drawings and will be hereinafter fully set forth.

In the drawings:

Figure 1 is a front elevation of a headlight with my improved tool applied thereto;

Fig. 2 is a side elevation, with parts broken away and in section, of the same;

Fig. 3 is a perspective view of the tool showing the working parts partly separated;

Fig. 4 is a longitudinal section through the meeting ends of the clamping band, and Fig. 5 is a detail perspective view showing more particularly the manner of mounting the lever or handle member.

The headlight is shown as comprising a cylindrical body 1 and an annular rim 2 of conventional design. In carrying out the present invention, I provide a circular band 3 of flat resilient metal of sufficient length to encircle any standard headlight when the ends of the band are brought into overlapping relation, as shown in the drawings. One end of the band carries a set screw or bolt 4 which passes through a longitudinal slot 5 in the opposite end of the band, and this screw 4 is engaged by a nut 6 adapted to be turned home against a washer 7 whereby the band may be clamped in its annular form and readily adjusted to the diameter of the rim to be removed or applied in an obvious manner, it being noted that the slot 5 extends approximately through one-half the length longitudinal extent of the band so that a wide range of adjustment is provided. The washer 7 bridges the entire width of the band and is provided at its sides with inwardly extending flanges 8 adapted to bear against the edges of the band so that the washer will be held against relative turning movement and the ends of the band will be held in alinement. The unslotted end of the band is folded back or doubled upon itself, as indicated at 9, and the head of the set bolt or screw 4 is disposed between the two plies thus formed, as shown clearly in Fig. 4, it being noted that the head of the bolt is flat so that it will not unduly deform the band and will not produce sharp ridges which might mar the headlight rim. The outer ply is, of course, provided with an opening through which the shank of the screw may pass and the two plies are secured together by screws or rivets 10 located at opposite sides of the screw, as shown in Figs. 3 and 4, whereby the screw will be effectually held against loss. The rear end of the outer ply 11 is firmly secured to the inner ply of the band by screws or rivets 12, as shown, and between the said screws or rivets and the next adjacent screws or rivets 10 a fulcrum post or screw 13 is inserted between the plies and across the band. This fulcrum post or screw is provided with a flat-sided head 14, preferably square, and in the edges of the two plies presented to the head are formed correspondingly shaped notches, shown at 15 in Fig. 5, to receive the head and thereby hold the post against turning movement. This construction also permits the head of the fulcrum post or screw to be brought within the transverse area of the clamping band so that it will not project beyond the same to interfere with the ready application of the tool to the rim or to be caught in some projecting part of the headlight or the vehicle and, consequently, accidentally withdrawn. It will also be noted that by reason of the arrangement of the securing screws or rivets transverse pockets are formed between the plies of the band, and the fulcrum post or screw and the head of the set bolt 4 are accommodated without excessive deformation of the band and without causing projecting parts which would tend to mar the headlight. The head 14 of the fulcrum screw or post is disposed at the rear edge of the clamping band, as the band is positioned upon the headlight, and the front end of the fulcrum post projects beyond the band to receive and support the lever or handle member 16 which extends across the band in a plane parallel with the plane of the band, as shown in Fig. 2. This lever or handle member is a flat bar having an opening 17 at one end whereby it may be pivotally engaged upon the projecting end of the fulcrum post and the diameter of this opening is greater than the diameter of the post so that mutilation of the threads of the post will be avoided and limited lateral movement of the lever will be permitted. The lever is retained upon the post by a nut 18 fitted on the end of the post in front of the lever and turned home sufficiently to prevent release of the lever while permitting relative pivotal movement of the same. At a point substantially diametrically opposite the fulcrum post, the band is equipped with a resistance lug or abutment 19 which may conveniently be a small flat plate rigidly secured to the band adjacent the end of the slot 5 and projecting forwardly from the band, the edges of the projecting portion of the abutment converging somewhat toward the band whereby, when engaged by the lever, it will aid in holding the lever against lateral movement away from the band.

It is thought the manner of using the device will be understood from the foregoing description, taken in connection with the accompanying drawings. To apply the band to a rim which is to be removed, the nut 6 is loosened upon the set bolt 4 sufficiently to permit relative movement of the overlapping ends of the clamping band and the said ends are separated sufficiently to permit the band to be placed around the rim. The band is then adjusted so that it will fit closely to the rim and the nut 6 is turned home so that the band will firmly clamp the rim, the overlapping end of the band tending to bend upon the overlapped end as the nut is tightened so that a further clamping action of the band upon the rim is attained. To avoid excessive deformation of the overlapping end of the band and to prevent the same being permanently bent by contact with the ends of the several securing screws or rivets, a spacing washer 20 may be interposed between the ends of the band about the bolt 4, as shown in Figs. 1 and 4. The interposition of this spacing washer also provides a flat clamping surface opposed to the inner surface of the outer washer 7, so that the nut 6 may be turned home with slight effort to very securely fasten the overlapping end of the band against slipping. The band having been thus secured about the rim of the headlight, the lever 16 is brought against the side edge of the abutment 19, as shown in Fig. 1, and pressure exerted upon the end of the lever against the abutment, as indicated by the arrow in Fig. 1, so that the rim may be turned about the headlight body. It will be seen that by reason of the engagement of the lever with the abutment at the opposite side of the rim from the fulcrum post of the lever the pressure applied to the lever is transmitted to the clamping band at two points so that a very little effort is needed to loosen a badly corroded or bent rim. It is also to be noted that in order to apply a misshapen rim to a headlight body, the band will be retained upon the rim while the necessary repairs, cleaning or inspection of the headlight is performed and then by engaging the lever with the opposite edge of the abutment a reverse annular movement may be imparted to the rim so that it will be firmly secured in position upon the headlight body. The opening 17 through the lever, as has been stated, has a diameter greater than the diameter of the fulcrum post or screw so that wear upon the threads of the screw is avoided and also to permit sufficient bodily lateral movement of the lever to permit it to clear the abutment when being shifted from one side of the same to the other side thereof. The device is exceedingly simple in construction and may be produced at a low cost, is not apt to require repairs and may be easily operated to efficiently attain the desired results.

Having thus described the invention, I claim:

A headlight rim removing tool comprising a clamping band consisting of a strip of resilient material having a circular contour with its end portions overlapped, the outer end portion being slotted longitudinally and the inner end portion being bent back upon itself to form an elongated tongue cooperating with the body of the strip to provide inner and outer jaws, a pivot extending transversely between the jaws adjacent the free end of the tongue, fasteners passed through the jaws at opposite sides of the pivot, a threaded post passed through an opening in the tongue close to adjacent fasteners for the pivot and having a flat base between the jaws, fasteners passed through the jaws at the other side of the base of said post and spaced well away from the joined ends of the jaws, the post being passed through the slot in the outer end of said band, a fastener threaded upon said post, an actuating lever carried by said pivot and extending across said band, and an abutment carried by the band and projecting transversely therefrom for engagement by said lever.

In testimony whereof I affix my signature.

WILLIAM H. GUTHRIE. [L. S.]